United States Patent
Isshiki et al.

(10) Patent No.: US 11,387,463 B2
(45) Date of Patent: Jul. 12, 2022

(54) ELECTRODE FOR ELECTROCHEMICAL DEVICE, ELECTROCHEMICAL DEVICE, AND METHOD OF PRODUCING ELECTRODE FOR ELECTROCHEMICAL DEVICE

(71) Applicant: ZEON CORPORATION, Chiyoda-ku Tokyo (JP)

(72) Inventors: Yasuhiro Isshiki, Tokyo (JP); Kenya Sonobe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 178 days.

(21) Appl. No.: 16/629,564

(22) PCT Filed: Jul. 17, 2018

(86) PCT No.: PCT/JP2018/026773
§ 371 (c)(1),
(2) Date: Jan. 9, 2020

(87) PCT Pub. No.: WO2019/021891
PCT Pub. Date: Jan. 31, 2019

(65) Prior Publication Data
US 2020/0176782 A1 Jun. 4, 2020

(30) Foreign Application Priority Data
Jul. 28, 2017 (JP) .............................. JP2017-146831

(51) Int. Cl.
*H01M 4/80* (2006.01)
*H01M 4/62* (2006.01)
*H01M 4/66* (2006.01)
*H01M 4/02* (2006.01)

(52) U.S. Cl.
CPC ........... *H01M 4/808* (2013.01); *H01M 4/622* (2013.01); *H01M 4/666* (2013.01); *H01M 2004/027* (2013.01); *H01M 2004/028* (2013.01)

(58) Field of Classification Search
CPC ...... H01M 4/808; H01M 4/622; H01M 4/666; H01M 4/04; H01M 4/62; H01M 2004/027; H01M 2004/028; H01M 4/0404; H01M 4/80; H01M 4/66; H01M 4/02; H01M 4/13; H01M 4/139
See application file for complete search history.

(56) References Cited

U.S. PATENT DOCUMENTS

| | | | | |
|---|---|---|---|---|
| 2013/0330622 | A1* | 12/2013 | Sasaki | H01M 4/1395 252/182.1 |
| 2014/0121329 | A1 | 5/2014 | Araki et al. | |
| 2015/0050554 | A1* | 2/2015 | Fukumine | H01M 4/0416 252/182.1 |

FOREIGN PATENT DOCUMENTS

| | | | | | |
|---|---|---|---|---|---|
| EP | 3648212 | A1 | | 5/2020 | |
| JP | 2006073308 | A | * | 3/2006 | ............. Y02E 60/10 |
| JP | 2006073308 | A | | 3/2006 | |
| JP | 2012204303 | A | | 10/2012 | |
| JP | 2013008485 | A | | 1/2013 | |
| JP | 2013206598 | A | * | 10/2013 | ............. Y02E 60/10 |
| JP | 2015211004 | A | * | 11/2015 | ............. Y02E 60/10 |
| JP | 2017069108 | A | | 4/2017 | |
| KR | 20120014634 | A | * | 2/2012 | ............ H01M 4/622 |
| WO | 2012165120 | A1 | | 12/2012 | |
| WO | 2013080989 | A1 | | 6/2013 | |
| WO | WO-2014157061 | A1 | * | 10/2014 | .............. H01M 4/13 |

OTHER PUBLICATIONS

English Translation of JP-2015211004-A , Positive electrode for nonaqueous electrolyte battery, 2015; Toppan Printing Co LTD. (Year: 2015).*
English Translation of WO-2014157061-A1, Positive electrode for lithium ion secondary cell, 2014, Zeon Corporation (Year: 2014).*
English Translation of JP-2006073308-A, Non-aqueous electrolytic liquid secondary battery, 2006, Matsushita Electric Ind Co Ltd. (Year: 2006).*
English Translation of JP 2013206598 A, Composite particle forsecondary battery cathode . . . Jul. 10, 2013, Nippon Zeon Co LTD (Year: 2013).*
English Translation of KR-1020120014634-A, Binder for a secondary battery having excellent adhesion of cell, and maintaining cycle performance, LG Chem; Feb. 20, 2012 (Year: 2012).*
Jan. 28, 2020, International Preliminary Report on Patentability issued in the International Patent Application No. PCT/JP2018/026773.
Mar. 23, 2021, the Extended European Search Report issued by the European Patent Office in the corresponding European Patent Application No. 18837257.7.

* cited by examiner

*Primary Examiner* — Maria Laios
*Assistant Examiner* — Adam J Francis
(74) *Attorney, Agent, or Firm* — Kenja IP Law PC

(57) ABSTRACT

Provided is an electrode for an electrochemical device that has excellent peel strength and can ensure a high level of safety of an electrochemical device. The electrode for an electrochemical device includes a current collector and an electrode mixed material layer on the current collector. The electrode mixed material layer contains an electrode active material, a binder, and a foaming agent. The binder is a polymer including a diene monomer unit and/or nitrile group-containing monomer unit, and in which the total proportion constituted by the diene monomer unit and nitrile group-containing monomer unit is 10 mass % to 80 mass %. Volume resistivity $R_A$ of a laminate of the electrode mixed material layer and current collector at 25° C. is 0.1 Ω·cm to 200 Ω·cm, and a ratio of volume resistivity $R_B$ of the laminate at 350° C. relative to volume resistivity $R_A$ of the laminate at 25° C. is 10 or more.

8 Claims, No Drawings

ELECTRODE FOR ELECTROCHEMICAL DEVICE, ELECTROCHEMICAL DEVICE, AND METHOD OF PRODUCING ELECTRODE FOR ELECTROCHEMICAL DEVICE

TECHNICAL FIELD

The present disclosure relates to an electrode for an electrochemical device, an electrochemical device, and a method of producing an electrode for an electrochemical device.

BACKGROUND

Electrochemical devices such as secondary batteries, primary batteries, and capacitors have been used in a wide variety of applications in recent years. An electrochemical device includes, for example, a plurality of electrodes obtained by forming an electrode mixed material layer on a current collector, and a separator that isolates these electrodes from one another.

There are cases in which thermal runaway of an electrochemical device may occur due to a short circuit between electrodes, overcharging, or the like. For this reason, attempts have been made to ensure the safety of electrochemical devices even when a short circuit between electrodes or overcharging occurs.

For example, Patent Literature (PTL) 1 discloses that with respect to a non-aqueous secondary battery including electrodes (positive electrode and negative electrode), a separator, a non-aqueous electrolyte solution, a case housing these components, and a safety mechanism that is sensitive to and actuated by a rise in internal pressure of the battery, excellent safety during overcharging is ensured through the inclusion of an organic chemical foaming agent inside the case. More specifically, PTL 1 discloses that as a result of inclusion of the organic chemical foaming agent, gas evolves from the organic chemical foaming agent in an initial stage of overcharging, leading to a rise in battery internal pressure and reliable actuation of the safety mechanism.

CITATION LIST

Patent Literature

PTL 1: JP 2006-73308 A

SUMMARY

Technical Problem

However, it has not been possible to ensure sufficient safety of an electrochemical device with the conventional method described in PTL 1. For example, in a situation in which a short circuit occurs between a positive electrode and a negative electrode in a non-aqueous secondary battery described as an electrochemical device in PTL 1, it is not possible to respond to a rapid rise in temperature caused by the short circuit, and ignition and cell rupture caused by thermal runaway cannot be sufficiently inhibited.

Moreover, an electrode of an electrochemical device is required to have strong close adherence between the electrode mixed material layer and current collector thereof (i.e., have excellent peel strength). However, it has not been possible to ensure excellent peel strength in the electrode described in PTL 1.

In other words, there is room for improvement of the technique described in PTL 1 in terms of ensuring a high level of safety of an electrochemical device and increasing the peel strength of an electrode.

Accordingly, an objective of the present disclosure is to provide a means for advantageously solving the problems set forth above.

Solution to Problem

The inventors conducted diligent investigation with the aim of solving the problems set forth above. The inventors discovered that the peel strength of an electrode can be increased and a high level of safety of an electrochemical device including the electrode can be ensured when an electrode active material, a specific binder, and a foaming agent are contained in an electrode mixed material layer, when the volume resistivity at 25° C. of a laminate in which the electrode mixed material layer and a current collector are stacked (hereinafter, also referred to as an "electrode laminate") is within a specific range, and when a ratio of the volume resistivity of the electrode laminate at 350° C. relative to the volume resistivity of the electrode laminate at 25° C. is not less than a specific value. In this manner, the inventors completed the present disclosure.

Specifically, the present disclosure aims to advantageously solve the problems set forth above by disclosing an electrode for an electrochemical device comprising a current collector and an electrode mixed material layer on the current collector, wherein the electrode mixed material layer contains an electrode active material, a binder, and a foaming agent, the binder is a polymer including either or both of a diene monomer unit and a nitrile group-containing monomer unit, and in which a proportion constituted by the diene monomer unit and a proportion constituted by the nitrile group-containing monomer unit are, in total, not less than 10 mass % and not more than 80 mass %, volume resistivity $R_A$ of a laminate of the electrode mixed material layer and the current collector at 25° C. is not less than 0.1 Ω·cm and not more than 200 Ω·cm, and a ratio of volume resistivity $R_B$ of the laminate at 350° C. relative to the volume resistivity $R_A$ of the laminate at 25° C. is 10 or more. An electrode for which the electrode mixed material layer contains an electrode active material, a binder formed by the polymer set forth above, and a foaming agent, and for which the electrode laminate has a volume resistivity $R_A$ (25° C.) that is within the specific range set forth above while also having a ratio of volume resistivity $R_B$ (350° C.) relative to the volume resistivity $R_A$ (25° C.) that is not less than the specific value set forth above in this manner has excellent peel strength and can provide an electrochemical device with a high level of safety.

The phrase "includes a monomer unit" as used in the present disclosure means that "a polymer obtained with the monomer includes a repeating unit derived from the monomer".

Moreover, the "volume resistivity" referred to in the present disclosure can be measured by a method described in the EXAMPLES section of the present specification.

In the presently disclosed electrode for an electrochemical device, the foaming agent preferably has a foaming temperature of not lower than 100° C. and not higher than 350° C. When the foaming temperature of the foaming agent is within the range set forth above, rate characteristics and high-temperature storage characteristics of an electrochemical device can be enhanced, and a high level of safety of the electrochemical device can sufficiently be ensured.

The "foaming temperature" referred to in the present disclosure can be measured by a method described in the EXAMPLES section of the present specification.

In the presently disclosed electrode for an electrochemical device, the electrode mixed material layer preferably contains not less than 0.01 parts by mass and not more than 10 parts by mass of the foaming agent per 100 parts by mass of the electrode active material. When the content of the foaming agent in the electrode mixed material layer is within the range set forth above, the peel strength of the electrode can be further improved. It is also possible to enhance rate characteristics and sufficiently ensure a high level of safety of an electrochemical device.

The "content of a foaming agent in an electrode mixed material layer" referred to in the present disclosure can be calculated by measuring nitrogen content by the combustion method (modified Dumas method) or the like in a case in which the foaming agent is an organonitrogen foaming agent such as described further below, for example, and can be calculated by measuring the released amount of carbon dioxide gas using a temperature-programmed desorption gas analyzer or the like in a case in which the foaming agent is an inorganic foaming agent such as described further below, for example. More specifically, the "content of a foaming agent in an electrode mixed material layer" referred to in the present disclosure can be measured by a method described in the EXAMPLES section of the present specification.

In the presently disclosed electrode for an electrochemical device, the foaming agent is preferably an organonitrogen foaming agent. When an organonitrogen foaming agent is used as the foaming agent, rate characteristics of an electrochemical device can be enhanced, and a high level of safety of the electrochemical device can sufficiently be ensured.

In the presently disclosed electrode for an electrochemical device, the polymer preferably has a glass-transition temperature of not lower than −30° C. and not higher than 100° C. When the glass-transition temperature of the polymer serving as the binder is within the range set forth above, the peel strength of the electrode can be further improved. It is also possible to enhance high-temperature storage characteristics and sufficiently ensure a high level of safety of an electrochemical device.

The "glass-transition temperature" referred to in the present disclosure can be measured by a method described in the EXAMPLES section of the present specification.

In a case in which the electrode active material of the presently disclosed electrode for an electrochemical device is a positive electrode active material, the volume resistivity $R_A$ of the laminate at 25° C. is preferably not less than 10 Ω·cm and not more than 180 Ω·cm. When the volume resistivity $R_A$ (25° C.) is within the range set forth above in a case in which the electrode for an electrochemical device contains a positive electrode active material as the electrode active material (i.e., in a case in which the electrode for an electrochemical device is a positive electrode for an electrochemical device), rate characteristics of an electrochemical device including the positive electrode can be improved.

In a case in which the electrode active material of the presently disclosed electrode for an electrochemical device is a negative electrode active material, the volume resistivity $R_A$ of the laminate at 25° C. is preferably not less than 0.2 Ω·cm and not more than 50 Ω·cm. When the volume resistivity $R_A$ (25° C.) is within the range set forth above in a case in which the electrode for an electrochemical device contains a negative electrode active material as the electrode active material (i.e., in a case in which the electrode for an electrochemical device is a negative electrode for an electrochemical device), rate characteristics of an electrochemical device including the negative electrode can be improved.

Moreover, the present disclosure aims to advantageously solve the problems set forth above by disclosing an electrochemical device comprising any one of the electrodes for an electrochemical device set forth above. When an electrochemical device includes any one of the electrodes set forth above, thermal runaway of the electrochemical device is inhibited even when a short circuit occurs between electrodes, for example, and a high level of safety of the electrochemical device is ensured.

Furthermore, the present disclosure aims to advantageously solve the problems set forth above by disclosing a method of producing any one of the electrodes for an electrochemical device set forth above, comprising: applying a slurry composition for an electrode mixed material layer containing the electrode active material, the binder, the foaming agent, and a solvent onto the current collector; and drying the slurry composition for an electrode mixed material layer applied on the current collector at a temperature of not lower than 50° C. and not higher than 130° C. to form an electrode mixed material layer. An electrode that is obtained as set forth above has excellent peel strength and can provide an electrochemical device with a high level of safety.

Advantageous Effect

According to the present disclosure, it is possible to provide an electrode for an electrochemical device that has excellent peel strength and can ensure a high level of safety of an electrochemical device, and also to provide a method of producing this electrode for an electrochemical device.

Moreover, according to the present disclosure, it is possible to provide an electrochemical device in which a high level of safety is ensured.

DETAILED DESCRIPTION

The following provides a detailed description of embodiments of the present disclosure.

The presently disclosed electrode for an electrochemical device can be used as an electrode of an electrochemical device such as a secondary battery, a primary battery, or a capacitor. Moreover, the presently disclosed electrode for an electrochemical device can be produced, for example, using the presently disclosed method of producing an electrode for an electrochemical device. Furthermore, the presently disclosed electrochemical device includes the presently disclosed electrode for an electrochemical device.

(Electrode for Electrochemical Device)

The presently disclosed electrode for an electrochemical device includes an electrode laminate in which an electrode mixed material layer is stacked at one side or both sides of a current collector. Note that layers other than the electrode mixed material layer and the current collector (hereinafter, referred to as "other layers") may be included at the surface of the electrode (particularly the surface at the electrode mixed material layer-side).

At least an electrode active material, a binder, and a foaming agent are contained in the electrode mixed material layer of the presently disclosed electrode. The binder in the electrode mixed material layer is a polymer including either or both of a diene monomer unit and a nitrile group-containing monomer unit, and in which the proportion constituted by the diene monomer unit and the proportion constituted by the nitrile group-containing monomer unit are, in total, not less than 10 mass % and not more than 80 mass %. Moreover, in the presently disclosed electrode, volume resistivity $R_A$ (25° C.) of the electrode laminate is not less than 0.1 Ω·cm and not more than 200 Ω·cm, and a ratio of volume resistivity $R_B$ (350° C.) of the electrode laminate relative to volume resistivity $R_A$ (25° C.) of the electrode laminate is 10 or more.

The presently disclosed electrode has excellent peel strength and can provide an electrochemical device with a high level of safety as a result of containing the foaming agent and specific binder set forth above in the electrode mixed material layer, and as a result of the volume resistivity $R_A$ (25° C.) of the electrode laminate being within a range of 0.1 Ω·cm to 200 Ω·cm and the value of volume resistivity $R_B$ (350° C.)/volume resistivity $R_A$ (25° C.) being 10 or more. The reason that the presently disclosed electrode for an electrochemical device has excellent peel strength and can be used to ensure a high level of safety of an electrochemical device as described above is presumed to be as follows.

Firstly, the polymer that is contained in the electrode mixed material layer as the binder has excellent strength as a result of including either or both of a diene monomer unit and a nitrile group-containing monomer unit in proportions such that the total amount thereof is within a specific range. The polymer having excellent strength in this manner displays high binding capacity. In addition, this polymer can strongly adhere components (electrode active material, etc.) in the electrode mixed material layer to the current collector through interactions with the foaming agent. Therefore, the inclusion of both the polymer having excellent binding capacity and the foaming agent in the electrode mixed material layer can increase the peel strength of the electrode. On the other hand, the foaming agent contained in the electrode mixed material layer contributes to improving the peel strength of the electrode as mentioned above and is also thought to contribute to safety of an electrochemical device. More specifically, when thermal runaway of an electrochemical device occurs and the temperature inside the device rises, the foaming agent in the electrode mixed material layer foams and releases incombustible gas. The released incombustible gas can prevent the spreading of fire by diluting combustible gas evolved through decomposition of electrolyte solution or the like due to the high temperature. Moreover, when the foaming agent foams to release incombustible gas, the strong adhesion through interactions between the foaming agent and the polymer described above is lost. This may cause destruction of electrode structure (for example, detachment of the electrode active material from the current collector) and cut off a conduction path. As a result, it is possible to inhibit generation of Joule heat and suppress a further rise in temperature. In addition, since the volume resistivity $R_A$ (25° C.) of the electrode laminate in the presently disclosed electrode is within a range of 0.1 Ω·cm to 200 Ω·cm, conductivity at around normal temperature is ensured, and device characteristics of an electrochemical device are ensured. Furthermore, the value of volume resistivity $R_B$ (350° C.)/volume resistivity $R_A$ (25° C.) for the presently disclosed electrode is 10 or more. In other words, the presently disclosed electrode can, through the contribution of the foaming agent described above, rapidly increase the volume resistivity thereof and inhibit passing of current at high temperature, and thus can sufficiently ensure safety of an electrochemical device even when the inside of the electrochemical device reaches a high temperature.

<Electrode Mixed Material Layer>

The electrode mixed material layer contains an electrode active material, a binder, and a foaming agent. Also note that the electrode mixed material layer may contain components other than the electrode active material, the binder, and the foaming agent (hereinafter, referred to as "other components").

<<Electrode Active Material>>

Known electrode active materials that are used in electrochemical devices may be used as the electrode active material without any specific limitations. Specifically, examples of electrode active materials that can be used in an electrode mixed material layer of a lithium ion secondary battery, which is one example of an electrochemical device, include, but are not specifically limited to, the electrode active materials described below.

[Positive Electrode Active Material]

Examples of positive electrode active materials that can be compounded in a positive electrode mixed material layer of a positive electrode in a lithium ion secondary battery include transition metal-containing compounds such as transition metal oxides, transition metal sulfides, and complex metal oxides of lithium and transition metals. The transition metal may, for example, be Ti, V, Cr, Mn, Fe, Co, Ni, Cu, Mo, or the like.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), lithium-containing complex oxide of Co-Ni-Mn, lithium-containing complex oxide of Ni-Mn-Al, lithium-containing complex oxide of Ni-Co-Al, olivine-type lithium iron phosphate ($LiFePO_4$), olivine-type lithium manganese phosphate ($LiMnPO_4$), lithium-rich spinel compounds represented by $Li_{1-x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

Of these positive electrode active materials, lithium-containing complex oxide of Co-Ni-Mn and lithium-containing complex oxide of Ni-Co-Al are preferable from a viewpoint of improving safety of a lithium ion secondary battery.

One of these positive electrode active materials may be used individually, or two or more of these positive electrode active materials may be used in combination.

[Negative Electrode Active Material]

Examples of negative electrode active materials that can be compounded in a negative electrode mixed material layer of a negative electrode in a lithium ion secondary battery include carbon-based negative electrode active materials, metal-based negative electrode active materials, and negative electrode active materials containing any combination thereof. Herein, "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal, simple substances of metals that can form lithium alloys (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Also, an oxide such as lithium titanate can be used.

Of these negative electrode active materials, graphitic materials such as natural graphite and artificial graphite are preferable.

One of these negative electrode active materials may be used individually, or two or more of these negative electrode active materials may be used in combination.

<<Binder>>

The binder is a component that closely adheres the electrode mixed material layer to the current collector and can inhibit detachment of components such as the electrode active material and the subsequently described foaming agent from the electrode mixed material layer.

The electrode mixed material layer of the presently disclosed electrode is required to contain a specific polymer as the binder. The polymer serving as the binder includes a diene monomer unit and/or a nitrile group-containing monomer unit as a repeating unit. Moreover, when the amount of all repeating units included in the polymer (i.e., the total amount of all monomer units and all structural units) is taken to be 100 mass %, the proportion constituted by the diene monomer unit and the proportion constituted by the nitrile group-containing monomer unit are, in total, not less than 10 mass % and not more than 80 mass %. The polymer serving as the binder includes at least 20 mass % of repeating units other than the diene monomer unit and the nitrile monomer unit (hereinafter, referred to as "other repeating units").

[Diene Monomer Unit and Nitrile Group-Containing Monomer Unit]

Diene Monomer Unit

Examples of diene monomers that can form the diene monomer unit include aliphatic conjugated diene monomers. Examples of aliphatic conjugated diene monomers include 1,3-butadiene, isoprene, 2,3-dimethyl-1,3-butadiene, and 1,3-pentadiene. Of these aliphatic conjugated diene monomers, 1,3-butadiene is preferable. One diene monomer may be used individually, or two or more diene monomers may be used in combination.

In a case in which the presently disclosed electrode for an electrochemical device is a negative electrode for an electrochemical device, it is preferable that the polymer includes a diene monomer unit. The proportion constituted by the diene monomer unit when the amount of all repeating units included in the polymer in the negative electrode mixed material layer is taken to be 100 mass % is preferably 15 mass % or more, and more preferably 20 mass % or more, and is preferably 70 mass % or less, more preferably 50 mass % or less, and even more preferably 40 mass % or less. The peel strength of the electrode can be further improved when the proportion constituted by the diene monomer unit in the polymer contained in the negative electrode mixed material layer is 15 mass % or more. On the other hand, a high level of safety of an electrochemical device can sufficiently be ensured as well as further improving the peel strength of the electrode when the proportion constituted by the diene monomer unit in the polymer contained in the negative electrode mixed material layer is 70 mass % or less.

Moreover, in a case in which the presently disclosed electrode for an electrochemical device is a negative electrode for an electrochemical device, the polymer is preferably a polymer (aliphatic conjugated diene/aromatic vinyl copolymer) that includes both an aliphatic conjugated diene monomer unit as a diene monomer unit and a subsequently described aromatic vinyl monomer unit, and in which the total proportion constituted by these two types of monomer units is more than 50 mass %.

Nitrile Group-Containing Monomer Unit

Examples of nitrile group-containing monomers that can form the nitrile group-containing monomer unit include $\alpha,\beta$-ethylenically unsaturated nitrile monomers. Specifically, any $\alpha,\beta$-ethylenically unsaturated compound that has a nitrile group can be used as an $\alpha,\beta$-ethylenically unsaturated nitrile monomer without any specific limitations. Examples include acrylonitrile; $\alpha$-halogenoacrylonitriles such as $\alpha$-chloroacrylonitrile and $\alpha$-bromoacrylonitrile; and $\alpha$-alkylacrylonitriles such as methacrylonitrile and $\alpha$-ethylacrylonitrile. Of these $\alpha$, $\beta$-ethylenically unsaturated nitrile monomers, acrylonitrile is preferable. One nitrile group-containing monomer may be used individually, or two or more nitrile group-containing monomers may be used in combination.

In a case in which the presently disclosed electrode for an electrochemical device is a positive electrode for an electrochemical device, it is preferable that the polymer includes a nitrile group-containing monomer unit. The proportion constituted by the nitrile group-containing monomer unit when the amount of all repeating units included in the polymer in the positive electrode mixed material layer is taken to be 100 mass % is preferably 35 mass % or more, more preferably 45 mass % or more, and even more preferably 55 mass % or more, and is preferably 75 mass % or less, and more preferably 70 mass % or less. The peel strength of the electrode can be further improved when the proportion constituted by the nitrile group-containing monomer unit in the polymer contained in the positive electrode mixed material layer is 35 mass % or more. On the other hand, a high level of safety of an electrochemical device can sufficiently be ensured as well as further improving the peel strength of the electrode when the proportion constituted by the nitrile group-containing monomer unit in the polymer contained in the positive electrode mixed material layer is 75 mass % or less.

Total Proportion of Diene Monomer Unit and Nitrile Group-Containing Monomer Unit When the amount of all repeating units included in the polymer is taken to be 100 mass %, the proportion constituted by the diene monomer unit and the proportion constituted by the nitrile group-containing monomer unit are, in total, required to be not less than 10 mass % and not more than 80 mass % as previously described, are preferably 20 mass % or more, and more preferably 30 mass % or more, and are preferably 75 mass % or less, and more preferably 70 mass % or less. The peel strength of the electrode decreases if the total proportion constituted by the diene monomer unit and the nitrile group-containing monomer unit in the polymer is less than 10 mass %. On the other hand, the polymer aggregates in the electrode mixed material layer if the total proportion constituted by the diene monomer unit and the nitrile group-containing monomer unit in the polymer is more than 80 mass %. As a consequence, the peel strength of the electrode decreases, and safety of an electrochemical device cannot sufficiently be ensured.

In a case in which the presently disclosed electrode for an electrochemical device is a positive electrode for an electrochemical device, the proportion constituted by the diene monomer unit and the proportion constituted by the nitrile group-containing monomer unit when the amount of all repeating units included in the polymer is taken to be 100 mass % are, in total, preferably 35 mass % or more, more preferably 45 mass % or more, and even more preferably 55 mass % or more, and are preferably 75 mass % or less, more preferably 70 mass % or less, and even more preferably 65 mass % or less. The peel strength of the electrode can be further improved when the total proportion constituted by the diene monomer unit and the nitrile group-containing monomer unit in the polymer contained in the positive electrode mixed material layer is 35 mass % or more. On the other hand, a high level of safety of an electrochemical device can sufficiently be ensured as well as further improving the peel strength of the electrode when the total proportion constituted by the diene monomer unit and the nitrile group-containing monomer unit in the polymer contained in the positive electrode mixed material layer is 75 mass % or less.

Moreover, in a case in which the presently disclosed electrode for an electrochemical device is a negative electrode for an electrochemical device, the proportion constituted by the diene monomer unit and the proportion constituted by the nitrile group-containing monomer unit when the amount of all repeating units included in the polymer is taken to be 100 mass % are, in total, preferably 20 mass % or more, more preferably 25 mass % or more, and even more preferably 30 mass % or more, and are preferably 65 mass % or less, more preferably 50 mass % or less, and even more preferably 40 mass % or less. The peel strength of the electrode can be further improved when the total proportion constituted by the diene monomer unit and the nitrile group-containing monomer unit in the polymer contained in the negative electrode mixed material layer is 20 mass % or more. On the other hand, a high level of safety of an electrochemical device can sufficiently be ensured as well as further improving the peel strength of the electrode when the total proportion constituted by the diene monomer unit and the nitrile group-containing monomer unit in the polymer contained in the negative electrode mixed material layer is 65 mass % or less.

[Other repeating units]

Examples of the other monomer units included in the polymer include, but are not specifically limited to, an alkylene structural unit, an acidic group-containing monomer unit, a (meth)acrylic acid ester monomer unit, a (meth)acrylamide monomer unit, and an aromatic vinyl monomer unit.

In the present disclosure, "(meth)acryl" is used to indicate "acryl" and/or "methacryl".

Alkylene Structural Unit

The alkylene structural unit is a repeating unit composed only of an alkylene structure represented by a general formula $—C_nH_{2n}—$ (n is an integer of 2 or more).

The alkylene structural unit may be linear or branched, but is preferably linear. In other words, the alkylene structural unit is preferably a linear alkylene structural unit. The carbon number of the alkylene structural unit is preferably 4 or more (i.e., n in the preceding general formula is preferably an integer of 4 or more).

The method by which the alkylene structural unit is introduced into the polymer is not specifically limited and may, for example, be the following method (1) or (2).

(1) A method in which a polymer including an aliphatic conjugated diene monomer unit is produced from a monomer composition containing an aliphatic conjugated diene monomer and then the polymer is hydrogenated to convert the aliphatic conjugated diene monomer unit to an alkylene structural unit (2) A method in which a polymer is produced from a monomer composition containing a 1-olefin monomer Of these methods, method (1) is preferable in terms of ease of production of the polymer.

Examples of aliphatic conjugated diene monomers that can form an aliphatic conjugated diene monomer unit that is convertible to an alkylene structural unit include those described above in the "Diene monomer unit and nitrile group-containing monomer unit" section. Of these aliphatic conjugated diene monomers, 1,3-butadiene is preferable. In other words, the alkylene structural unit is preferably a structural unit obtained through hydrogenation of an aliphatic conjugated diene monomer unit (i.e., is preferably a hydrogenated aliphatic conjugated diene unit), and is more preferably a structural unit obtained through hydrogenation of a 1,3-butadiene unit (i.e., is more preferably a hydrogenated 1,3-butadiene unit).

Examples of the 1-olefin monomer include ethylene, propylene, 1-butene, and 1-hexene.

One of these aliphatic conjugated diene monomers or 1-olefin monomers may be used individually, or two or more of these aliphatic conjugated diene monomers or 1-olefin monomers may be used in combination.

Acidic Group-Containing Monomer Unit

Examples of acidic group-containing monomers that can form an acidic group-containing monomer unit include carboxy group-containing monomers, sulfo group-containing monomers, and phosphate group-containing monomers. These carboxy group-containing monomers, sulfo group-containing monomers, and phosphate group-containing monomers may be any of those described in JP 2017-069108 A. Of these acidic group-containing monomers, carboxy group-containing monomers are preferable, and methacrylic acid and itaconic acid are more preferable.

One acidic group-containing monomer may be used individually, or two or more acidic group-containing monomers may be used in combination.

(Meth)Acrylic Acid Ester Monomer Unit

Examples of (meth)acrylic acid ester monomers that can form a (meth)acrylic acid ester monomer unit include those described in JP 2017-050112 A. Of these (meth)acrylic acid ester monomers, 2-hydroxyethyl acrylate is preferable.

One (meth)acrylic acid ester monomer may be used individually, or two or more (meth)acrylic acid ester monomers may be used in combination.

(Meth)Acrylamide Monomer Unit

Examples of (meth)acrylamide monomers that can form a (meth)acrylamide monomer unit include acrylamide and methacrylamide. Of these (meth)acrylamide monomers, acrylamide is preferable.

One of acrylamide and methacrylamide may be used individually, or both of acrylamide and methacrylamide may be used in combination.

Aromatic Vinyl Monomer

Examples of aromatic vinyl monomers that can form an aromatic vinyl monomer unit include styrene, α-methylstyrene, vinyltoluene, and divinylbenzene. Of these aromatic vinyl monomers, styrene is preferable.

One aromatic vinyl monomer may be used individually, or two or more aromatic vinyl monomers may be used in combination.

Proportion of Other Repeating Units

The proportion constituted by other repeating units when the amount of all repeating units included in the polymer is taken to be 100 mass % is not less than 20 mass % and not more than 80 mass %, and is preferably 30 mass % or more.

[Production Method]

No specific limitations are placed on the method by which the polymer serving as the binder described above is produced. The polymer serving as the binder can be produced by, for example, polymerizing a monomer composition containing the monomers set forth above and subsequently performing hydrogenation as necessary.

The fractional content of each monomer in the monomer composition used to produce the polymer can be set in accordance with the fractional content of each repeating unit in the polymer.

The polymerization method is not specifically limited and may, for example, be any of solution polymerization, suspension polymerization, bulk polymerization, and emulsion polymerization. Also, any polymerization reaction can be used, such as ionic polymerization, radical polymerization, or living radical polymerization.

The method of hydrogenation of the polymer is also not specifically limited and may be a typical method using a catalyst (for example, refer to WO 2012/165120 A1, WO 2013/080989 A1, and JP 2013-8485 A).

[Glass-Transition Temperature]

The glass-transition temperature of the polymer serving as the binder that is produced as set forth above is preferably −30° C. or higher, more preferably −25° C. or higher, even more preferably −20° C. or higher, and particularly preferably −10° C. or higher, and is preferably 100° C. or lower, more preferably 70° C. or lower, even more preferably 50° C. or lower, and particularly preferably 30° C. or lower. The peel strength of the electrode can be further increased while also improving high-temperature storage characteristics of an electrochemical device when the glass-transition temperature of the polymer is −30° C. or higher. On the other hand, the peel strength of the electrode can be further increased while also sufficiently ensuring a high level of safety of an electrochemical device when the glass-transition temperature of the polymer is 100° C. or lower.

[Content]

The amount of the polymer serving as the binder that is contained in the electrode mixed material layer per 100 parts by mass of the electrode active material is preferably 0.1 parts by mass or more, more preferably 0.5 parts by mass or more, even more preferably 0.6 parts by mass or more, and particularly preferably 0.8 parts by mass or more, and is preferably 10 parts by mass or less, more preferably 7 parts by mass or less, even more preferably 5 parts by mass or less, and particularly preferably 3 parts by mass or less. The peel strength of the electrode can be further improved when the content of the polymer in the electrode mixed material layer is 0.1 parts by mass or more per 100 parts by mass of the electrode active material, whereas rate characteristics of an electrochemical device can be enhanced when the content of the polymer in the electrode mixed material layer is 10 parts by mass or less per 100 parts by mass of the electrode active material.

<<Foaming Agent>>

The foaming agent can be a component that releases an incombustible gas such as nitrogen, carbon dioxide, ammonia, or water vapor through thermal decomposition.

[Foaming Temperature]

The foaming temperature of the foaming agent is preferably 100° C. or higher, more preferably 140° C. or higher, even more preferably 150° C. or higher, particularly preferably 180° C. or higher, and most preferably 200° C. or higher, and is preferably 350° C. or lower, more preferably 300° C. or lower, even more preferably 280° C. or lower, and particularly preferably 250° C. or lower. A foaming temperature of 100° C. or higher for the foaming agent can inhibit unexpected foaming during normal operation or storage of an electrochemical device and can ensure rate characteristics and high-temperature storage characteristics of the electrochemical device. On the other hand, a foaming temperature of 350° C. or lower for the foaming agent enables appropriate foaming during a rise in internal temperature of an electrochemical device caused by an internal short circuit or the like and can sufficiently ensure a high level of safety of the electrochemical device.

[Type]

The foaming agent may be either an organic foaming agent or an inorganic foaming agent without any specific limitations.

The organic foaming agent is preferably an organic foaming agent (organonitrogen foaming agent) that releases nitrogen as an incombustible gas from a viewpoint of enhancing rate characteristics and sufficiently ensuring a high level of safety of an electrochemical device. Examples of organonitrogen foaming agents include guanidine compounds (guanidine nitrate, nitroguanidine, aminoguanidine nitrate, etc.), azo compounds (azodicarbonamide, azobisisobutyronitrile, etc.), triazine compounds (melamine, ammeline, ammelide, melamine cyanurate, trihydrazine triazine (1,3,5-triazine-2, 4,6(1H,3H,5H)-trione trihydrazone), etc.), hydrazide compounds (oxybis(benzenesulfonyl hydrazide), p-toluenesulfonyl hydrazide, etc.), hydrazo compounds (hydrazodicarbonamide, p-toluenesulfonyl semicarbazide, etc.), nitroamine compounds (dinitrosopentamethylenetetramine, trimethylenetrinitramine, etc.), tetrazole compounds (5-aminotetrazole, 5-phenyltetrazole, etc.), and bitetrazole compounds (5,5'-bitetrazole diammonium, bitetrazole piperazine, etc.).

Examples of inorganic foaming agents include hydrogen carbonates such as sodium hydrogen carbonate.

One of these foaming agents may be used individually, or two or more of these foaming agents may be used in combination in a freely selected ratio.

Of these foaming agents, azo compounds, triazine compounds, hydrazide compounds, hydrazo compounds, and hydrogen carbonate compounds are preferable, triazine compounds and azo compounds are more preferable, and melamine cyanurate and azodicarbonamide are even more preferable from a viewpoint of further enhancing rate characteristics and more sufficiently ensuring a high level of safety of an electrochemical device.

[Content]

The amount of the foaming agent that is contained in the electrode mixed material layer per 100 parts by mass of the electrode active material is preferably 0.01 parts by mass or more, more preferably 0.05 parts by mass or more, even more preferably 0.1 parts by mass or more, particularly preferably 0.3 parts by mass or more, and most preferably 0.5 parts by mass or more, and is preferably 10 parts by mass or less, more preferably 5 parts by mass or less, even more preferably 3 parts by mass or less, particularly preferably 2 parts by mass or less, and most preferably 1 part by mass or less. The peel strength of the electrode can be further increased while also sufficiently ensuring a high level of safety of an electrochemical device when the content of the foaming agent in the electrode mixed material layer is 0.01 parts by mass or more per 100 parts by mass of the electrode active material. On the other hand, the peel strength of the electrode can be further increased while also improving rate characteristics of an electrochemical device when the content of the foaming agent in the electrode mixed material layer is 10 parts by mass or less per 100 parts by mass of the electrode active material.

The amount of the foaming agent that is contained in the electrode mixed material layer per 100 parts by mass of the polymer serving as the binder is preferably 10 parts by mass or more, more preferably 20 parts by mass or more, and even more preferably 30 parts by mass or more, and is preferably 600 parts by mass or less, more preferably 300 parts by mass or less, and even more preferably 150 parts by mass or less. Good interaction between the polymer serving as the binder and the foaming agent can be achieved and the peel strength of the electrode can be further increased when the content of the foaming agent in the electrode mixed material layer is not less than 10 parts by mass and not more than 600 parts by mass per 100 parts by mass of the polymer serving as the binder.

<<Other Components>>

In addition to the electrode active material, binder, and foaming agent set forth above, the electrode mixed material layer may optionally contain other binders having different chemical compositions to the binder described above and known additives that can be added in electrode mixed material layers such as conductive materials, wetting agents, viscosity modifiers, and additives for electrolyte solution. One of these other components may be used individually, or two or more of these other components may be used in combination. The content of the above-described additives in the electrode mixed material layer may, for example, be set as 10 parts by mass or less per 100 parts by mass of the binder, or as 5 parts by mass or less per 100 parts by mass of the binder.

<Current collector>

The current collector may be a material having electrical conductivity and electrochemical durability that is selected in accordance with the type of electrochemical device. The current collector of an electrode for a lithium ion secondary battery, for example, may be a current collector made from iron, copper, aluminum, nickel, stainless steel, titanium, tantalum, gold, platinum, or the like. Of these examples, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

A known layer such as a conductive adhesive layer may be disposed at the surface of the current collector. In other words, the current collector may be a conductive adhesive layer-equipped current collector that includes a conductive adhesive layer at the surface.

<Volume Resistivity of Electrode Laminate>

In the presently disclosed electrode for an electrochemical device, the volume resistivity $R_A$ (25° C.) of an electrode laminate in which the electrode mixed material layer and current collector set forth above are stacked is required to be not less than 0.1 Ω·cm and not more than 200 Ω·cm from a viewpoint of sufficiently ensuring device characteristics (rate characteristics, etc.) of an electrochemical device.

In a case in which the presently disclosed electrode for an electrochemical device is a positive electrode for an electrochemical device, the volume resistivity $R_A$ (25° C.) of the electrode laminate is preferably 10 Ω·cm or more, more preferably 20 Ω·cm or more, and even more preferably 30 Ω·cm or more, and is preferably 180 Ω·cm or less, more preferably 150 Ω·cm or less, and even more preferably 100 S/cm or less.

Moreover, in a case in which the presently disclosed electrode for an electrochemical device is a negative electrode for an electrochemical device, the volume resistivity $R_A$ (25° C.) of the electrode laminate is preferably 0.2 Ω·cm or more, more preferably 0.3 Ω·cm or more, even more preferably 0.4 Ω·cm or more, and particularly preferably 0.8 Ω·cm or more, and is preferably 50 Ω·cm or less, more preferably 10 Ω·cm or less, and even more preferably 3 Ω·cm or less.

The volume resistivity $R_A$ (25° C.) of the electrode laminate can be adjusted by, for example, altering the type and amount of the electrode active material, binder, conductive material, and foaming agent contained in the electrode mixed material layer and the production conditions (stirring time, solid content concentration during stirring, stirring rate, etc.) of a slurry composition for the electrode mixed material layer.

A ratio of the volume resistivity $R_B$ (350° C.) of the electrode laminate relative to the volume resistivity $R_A$ (25° C.) of the electrode laminate is required to be 10 or more from a viewpoint of ensuring a high level of safety of an electrochemical device, and is preferably 20 or more, more preferably 30 or more, even more preferably 100 or more, and particularly preferably 200 or more. Although no specific limitations are placed on the upper limit for the ratio of the volume resistivity $R_B$ (350° C.) relative to the volume resistivity $R_A$ (25° C.), this ratio is normally 10,000 or less.

Note that the ratio of the volume resistivity $R_B$ (350° C.) of the electrode laminate relative to the volume resistivity $R_A$ (25° C.) of the electrode laminate can be increased, in particular, by increasing the volume resistivity $R_B$ (350° C.). The volume resistivity $R_B$ (350° C.) can be increased through selection of the type of binder or foaming agent or by increasing the amount of the foaming agent, for example.

<Other Layers>

Examples of other layers that may optionally be disposed at the surface of the electrode (particularly the surface at the electrode mixed material layer-side) include, but are not specifically limited to, a known heat-resistant layer that is provided with the aim of improving heat resistance and a known adhesive layer that is provided with the aim of improving adhesiveness with another battery component such as a separator.

(Method of Producing Electrode for Electrochemical Device)

The presently disclosed electrode for an electrochemical device set forth above can, for example, be produced using the presently disclosed method of producing an electrode for an electrochemical device.

The presently disclosed method of producing an electrode includes a step of applying a slurry composition for an electrode mixed material layer containing an electrode active material, a binder, a foaming agent, and a solvent onto a current collector (application step) and a step of drying the slurry composition for an electrode mixed material layer applied on the current collector at a temperature of not lower than 50° C. and not higher than 130° C. to form an electrode mixed material layer (electrode mixed material layer formation step).

Water or an organic solvent can be used as the solvent in the slurry composition for an electrode mixed material layer without any specific limitations. Examples of organic solvents that can be used include acetonitrile, N-methyl-2-pyrrolidone, tetrahydrofuran, acetone, acetylpyridine, cyclopentanone, dimethylformamide, dimethyl sulfoxide, methylformamide, methyl ethyl ketone, furfural, ethylenediamine, dimethylbenzene (xylene), methylbenzene (toluene), cyclopentyl methyl ether, and isopropyl alcohol.

One of these solvents may be used individually, or two or more of these solvents may be used as a mixture in a freely selected mixing ratio.

The slurry composition for an electrode mixed material layer may also contain any components other than those described above. For example, the slurry composition for an electrode mixed material layer can contain any of the other components that can be contained in the electrode mixed material layer as previously described.

<Application Step>

The slurry composition for an electrode mixed material layer can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the desired electrode mixed material layer thickness.

<Electrode Mixed Material Layer Formation Step>

The slurry composition for an electrode mixed material layer on the current collector may be dried by any commonly known method without any specific limitations. Examples of drying methods that can be used include drying by warm, hot, or low-humidity air; drying in a vacuum; and drying by irradiation with infrared light, electron beams, or the like. In the presently disclosed method of producing an electrode, the atmosphere temperature during drying of the slurry composition for an electrode mixed material layer (i.e., the drying temperature) is not lower than 50° C. and not higher than 130° C., and is preferably not lower than 70° C. and not higher than 100° C. A drying temperature of not lower than 50° C. and not higher than 130° C. can ensure drying efficiency while also inhibiting decomposition of the foaming agent.

A pressing process or the like may optionally be performed after the drying to obtain an electrode including an electrode mixed material layer on the current collector.

(Electrochemical Device)

The presently disclosed electrochemical device may, for example, be a secondary battery such as a lithium ion secondary battery, a primary battery such as a lithium battery or a lithium-air battery, or a capacitor such as an electric double-layer capacitor or a lithium ion capacitor, but is not specifically limited thereto, and is preferably a secondary battery (particularly a lithium ion secondary battery) for which there has been increasing need for a balance of high capacity and safety in recent years. The presently disclosed electrochemical device includes the presently disclosed electrode. As a result of including the presently disclosed electrode, the presently disclosed electrochemical device inhibits thermal runaway and maintains a high level of safety.

Although the following describes, as one example, a case in which the electrochemical device is a lithium ion secondary battery, the presently disclosed electrochemical device is not limited to the following example. A lithium ion secondary battery corresponding to the presently disclosed electrochemical device normally includes electrodes (positive electrode and negative electrode), an electrolyte solution, and a separator, wherein the presently disclosed electrode for an electrochemical device is used for at least one of the positive electrode and the negative electrode.

<Electrodes>

A known electrode can be used without any specific limitations as an electrode other than the presently disclosed electrode for an electrochemical device set forth above that may be used in the lithium ion secondary battery corresponding to the presently disclosed electrochemical device. Specifically, an electrode obtained by forming an electrode mixed material layer on a current collector by a known production method may be used as an electrode other than the electrode for an electrochemical device set forth above.

<Separator>

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the capacity per volume.

<Electrolyte solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as y-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

Moreover, a known additive such as vinylene carbonate (VC), fluoroethylene carbonate (FEC), or ethyl methyl sulfone may be added to the electrolyte solution.

<Production Method of Lithium Ion Secondary Battery>

The lithium ion secondary battery corresponding to the presently disclosed electrochemical device can be produced by, for example, stacking the positive electrode and the negative electrode with the separator interposed in-between, performing rolling, folding, or the like of the resultant laminate as necessary to place the laminate in a battery container, injecting the electrolyte solution into the battery container, and sealing the battery container. Note that at least one of the positive electrode and the negative electrode is the presently disclosed electrode for an electrochemical device. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to evaluate the foaming temperature of a foaming agent, the glass-transition temperature of a polymer, the content of a foaming agent in an electrode mixed material layer, the volume resistivity of an electrode laminate, the peel strength of an electrode, and the rate characteristics, high-temperature storage characteristics, and safety of a lithium ion secondary battery.

<Foaming Temperature>

In thermogravimetric analysis using a thermogravimetric analyzer (TG8110 produced by Rigaku Corporation), the mass of a foaming agent was measured while heating the foaming agent from 25° C. to 500° C. at a heating rate of 20° C./min in an air atmosphere, and the temperature at which the measured mass reached 95% of the mass at the start of measurement (25° C.) (i.e., the 5% mass loss temperature) was taken to be the foaming temperature of the foaming agent.

<Glass-Transition Temperature>

Each polymer used as a binder was taken as a measurement sample. A differential scanning calorimetry (DSC) curve was obtained using a differential scanning calorimeter (EXSTAR DSC6220 produced by SII NanoTechnology Inc.) by weighing 10 mg of the measurement sample into an aluminum pan and then performing measurement in a measurement temperature range of −100° C. to 500° C. at a heating rate of 10° C./min under conditions stipulated by JIS Z 8703 and with an empty aluminum pan as a reference. In the heating process, the glass-transition temperature (° C.) was determined as an intersection point of a base line directly before a heat absorption peak on the DSC curve at which a differential signal (DDSC) reached 0.05 mW/min/mg or more and a tangent to the DSC curve at a first inflection point to appear after the heat absorption peak.

<Content of Foaming Agent>

<<Organonitrogen Foaming Agent>>

A sample was obtained by scraping an electrode mixed material layer from a current collector of a produced electrode. Next, 1 g of the sample was immersed in 50 g of 25° C. tetrahydrofuran for 24 hours. After immersion, the sample was separated using a membrane filter (H050A090C produced by Advantec Co., Ltd.), and solid matter on the filter was collected. The nitrogen content in the collected solid matter was measured by the modified Dumas method, and then the content (parts by mass per 100 parts by mass of electrode active material) of an organonitrogen foaming agent in the electrode mixed material layer was calculated based on the determined nitrogen content.

Note that the type of organonitrogen foaming agent contained in an electrode mixed material layer can be identified by a known analytical technique (for example, gas chromatography, high-performance liquid chromatography, or NMR). Therefore, in a situation in which the type of organonitrogen foaming agent contained in an electrode mixed material layer is unknown, the type of organonitrogen foaming agent can be identified by any of the aforementioned techniques, and then the molecular weight of the identified organonitrogen foaming agent can be used to calculate the content of the organonitrogen foaming agent in the electrode mixed material layer.

<<Inorganic Foaming Agent>>

A sample was obtained by scraping an electrode mixed material layer from a current collector of a produced electrode. A temperature-programmed desorption gas analyzer (TDS1200 produced by ESCO, Ltd.) was used to heat 5 mg of the sample to 200° C. at a heating rate of 10° C./min. The released amount of carbon dioxide gas was calculated from the number of molecules detected for a mass number of 44. The content (parts by mass per 100 parts by mass of electrode active material) of an inorganic foaming agent in the electrode mixed material layer was then calculated based on the released amount of carbon dioxide gas that had been determined.

Note that the type of inorganic foaming agent contained in an electrode mixed material layer can be identified by a known analytical technique (for example, gas chromatography, high-performance liquid chromatography, or NMR). Therefore, in a situation in which the type of inorganic foaming agent contained in an electrode mixed material layer is unknown, the type of inorganic foaming agent can be identified by any of the aforementioned techniques, and then the molecular weight of the identified inorganic foaming agent can be used to calculate the content of the inorganic foaming agent in the electrode mixed material layer.

<Volume Resistivity>

A circle of 1.2 cm in diameter (circle area taken to be S ($cm^2$)) was punched out from a produced electrode (electrode laminate) as a test specimen. The thickness d (cm) of the test specimen was accurately measured. The test specimen was then sandwiched in a load cell of a tensile compression tester (SV-301NA produced by Imada-SS Corporation) and was pressed with a pressure of 20 MPa. A two-terminal type clip was connected to the load cell and a measurement cable was connected to a polarization system (HSV-110 produced by Hokuto Denko Corporation). Current was passed through the load cell for 1 minute with a set current I of 10 mA in chronopotentiometry mode, and the voltage (V) at that time was measured. The volume resistivity (Ω·cm) was calculated as $(V/I) \times (S/d)$. In this measurement, the volume resistivity measured in an environment having a temperature of 25° C. and a dew point of −40° C. was taken to be $R_A$ (Ω·cm). Moreover, the volume resistivity measured in an environment having a temperature of 25° C. and a dew point of −40° C. after the electrode had been heated in a 350° C. thermostatic chamber for 30 minutes was taken to be $R_B$ (Ω·cm). The value of $R_B/R_A$ was calculated. A smaller volume resistivity $R_A$ (25° C.) for the electrode laminate indicates that the electrode has better electrical conductivity and contributes to improving lithium ion secondary battery rate characteristics. Moreover, a larger $R_B/R_A$ value for the electrode laminate indicates that the electrode contributes to improving lithium ion secondary battery safety.

In the present disclosure, in a case in which an electrode for an electrochemical device includes another layer at the surface at the electrode mixed material layer-side, for example, the volume resistivity of the electrode laminate is taken to be that measured either before stacking the other layer or after peeling off the other layer.

<Peel Strength>
<<Negative Electrode>>

A rectangle of 100 mm in length and 10 mm in width was cut out from a produced negative electrode as a test specimen. Next, the test specimen was placed with the surface at which the negative electrode mixed material layer was located facing downward and the surface of the negative electrode mixed material layer was affixed to the surface of a substrate made from SUS using cellophane tape (tape prescribed by JIS Z1522). Thereafter, one end of the current collector was pulled in a vertical direction at a pulling speed of 50 mm/min to peel off the current collector, and the stress (N/m) during this peeling was measured. This measurement was performed three times in total. The average value of these measurements was determined as the peel strength of the negative electrode and was evaluated by the following standard. A larger value for the peel strength of the negative electrode indicates stronger close adherence between the negative electrode mixed material layer and the current collector and better adhesiveness of the negative electrode mixed material layer.

A: Negative electrode peel strength of 3.5 N/m or more
B: Negative electrode peel strength of not less than 3.0 N/m and less than 3.5 N/m
C: Negative electrode peel strength of not less than 2.5 N/m and less than 3.0 N/m D: Negative electrode peel strength of not less than 1.5 N/m and less than 2.5 N/m
E: Negative electrode peel strength of less than 1.5 N/m
<<Positive Electrode>>

A rectangle of 100 mm in length and 10 mm in width was cut out from a produced positive electrode as a test specimen. Next, the test specimen was placed with the surface at which the positive electrode mixed material layer was located facing downward and the surface of the positive electrode mixed material layer was affixed to the surface of a substrate made from SUS using cellophane tape (tape prescribed by JIS Z1522). Thereafter, one end of the current collector was pulled in a vertical direction at a pulling speed of 50 mm/min to peel off the current collector, and the stress (N/m) during this peeling was measured. This measurement was performed three times in total. The average value of these measurements was determined as the peel strength of the positive electrode and was evaluated by the following standard. A larger value for the peel strength of the positive electrode indicates stronger close adherence between the positive electrode mixed material layer and the current collector and better adhesiveness of the positive electrode mixed material layer.

A: Positive electrode peel strength of 50.0 N/m or more
B: Positive electrode peel strength of not less than 40.0 N/m and less than 50.0 N/m
C: Positive electrode peel strength of not less than 30.0 N/m and less than 40.0 N/m
D: Positive electrode peel strength of not less than 20.0 N/m and less than 30.0 N/m
E: Positive electrode peel strength of less than 20.0 N/m
<Rate Characteristics>

A produced lithium ion secondary battery was left at rest for 5 hours at a temperature of 25° C. after being filled with electrolyte solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.35 V) and CC discharging of the lithium ion secondary battery was performed to a cell voltage of 3.00 V with a 0.2 C constant current. This charging and discharging at 0.2 C was repeated three times.

Next, the lithium ion secondary battery was subjected to 0.2 C constant-current charging and discharging between cell voltages of 4.35 V and 3.00 V in an environment having a temperature of 25° C., and the discharge capacity at that time was defined as C0. Thereafter, the lithium ion secondary battery was CC-CV charged with a 0.2 C constant current in the same manner and was discharged to 2.5 V with a 0.5 C constant current in an environment having a temperature of −10° C. The discharge capacity at that time was defined as C1. The capacity maintenance rate indicated by $\Delta C = (C1/C0) \times 100 (\%)$ was calculated as a rate characteristic and was evaluated by the following standard. A larger value for the capacity maintenance rate $\Delta C$ indicates higher discharge capacity at high current in a low temperature environment, and lower internal resistance.

A: Capacity maintenance rate $\Delta C$ of 70% or more
B: Capacity maintenance rate $\Delta C$ of not less than 65% and less than 70%
C: Capacity maintenance rate $\Delta C$ of not less than 60% and less than 65%
D: Capacity maintenance rate $\Delta C$ of less than 60%
<High-Temperature Storage Characteristics>

A produced lithium ion secondary battery was subjected to a charge/discharge operation of charging to 4.35 V by a constant-current constant-voltage (CC-CV) method with a charge rate of 0.2 C (cut-off condition: 0.02 C) and discharging to 3.0 V by a constant-current (CC) method with a discharge rate of 0.2 C in a 25° C. atmosphere, and the initial capacity C0' was measured.

The lithium ion secondary battery was then charged to 4.35 V by a constant-current constant-voltage (CC-CV) method with a charge rate of 0.2 C (cut-off condition: 0.02 C). The lithium ion secondary battery was subsequently stored in a 60° C. thermostatic tank for 14 days and was then left at rest for 2 hours in a 25° C. atmosphere. Next, the lithium ion secondary battery was discharged to 3.0 V by a constant-current (CC) method with a discharge rate of 0.2 C, and the post-high temperature storage capacity C1' was measured. The capacity maintenance rate $\Delta C' = (C1'/C0') \times 100(\%)$ was calculated and was evaluated by the following standard. A larger value for the capacity maintenance rate $\Delta C'$ indicates less reduction of discharge capacity due to high-temperature storage and better high-temperature storage characteristics.

A: Capacity maintenance rate $\Delta C'$ of 90% or more
B: Capacity maintenance rate $\Delta C'$ of not less than 87% and less than 90%
C: Capacity maintenance rate $\Delta C'$ of not less than 84% and less than 87% D: Capacity maintenance rate $\Delta C'$ of less than 84%
<Safety>

A produced lithium ion secondary battery was charged to 4.35 V by a constant-current constant-voltage (CC-CV) method with a charge rate of 0.2 C (cut-off condition: 0.02 C) in a 25° C. atmosphere. Thereafter, an iron nail of 3 mm in diameter and 10 cm in length was pierced through the lithium ion secondary battery at a rate of 5 m/min in a roughly central location to induce a short circuit. A short circuit was induced by the same operation for 5 lithium ion secondary batteries (test specimens). The number of test specimens for which rupture and ignition did not occur was used to evaluate safety by the following standard.

A: Number of test specimens for which rupture and ignition do not occur is 4 or 5

B: Number of test specimens for which rupture and ignition do not occur is 3

C: Number of test specimens for which rupture and ignition do not occur is 2

D: Number of test specimens for which rupture and ignition do not occur is 1

E: Number of test specimens for which rupture and ignition do not occur is 0

(Production of Binder)

<Polymer A>

An autoclave equipped with a stirrer was charged with 240 parts of deionized water, 2.5 parts of sodium alkylbenzenesulfonate as an emulsifier, 60.0 parts of acrylonitrile as a nitrile group-containing monomer, and 0.45 parts of t-dodecyl mercaptan as a chain transfer agent in this order, and the inside thereof was purged with nitrogen. Thereafter, 40.0 parts of 1,3-butadiene as a diene monomer was fed into the autoclave under pressure, 0.25 parts of ammonium persulfate was added as a polymerization initiator, and a polymerization reaction was carried out at a reaction temperature of 40° C. Through this reaction, a water dispersion of a copolymer of acrylonitrile and 1,3-butadiene was obtained. The polymerization conversion rate was 85%.

Further deionized water was added to the resultant water dispersion of the copolymer so as to obtain a water dispersion that was adjusted to a total solid content concentration of 12 mass %. A stirrer-equipped autoclave of 1 L in capacity was charged with 400 mL (total solid content: 48 g) of the obtained water dispersion, and then nitrogen gas was passed for 10 minutes to remove dissolved oxygen in the dispersion. Thereafter, 75 mg of palladium acetate as a hydrogenation reaction catalyst was dissolved in 180 mL of deionized water to which nitric acid had been added in an amount of 4 molar equivalents of the palladium (Pd), and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (first stage hydrogenation reaction) was performed for 6 hours.

The autoclave was subsequently returned to atmospheric pressure. Then, 25 mg of palladium acetate as a hydrogenation reaction catalyst was dissolved in 60 mL of deionized water to which nitric acid had been added in an amount of 4 molar equivalents of the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (second stage hydrogenation reaction) was performed for 6 hours.

Next, the contents of the autoclave were returned to normal temperature and the system was converted to a nitrogen atmosphere. Thereafter, the contents were concentrated to a solid content concentration of 40% using an evaporator to yield a water dispersion of a polymer. NMP was added to the obtained water dispersion of the polymer so as to adjust the solid content concentration of the polymer to 7%. Water and excess NMP were then removed by vacuum distillation at 90° C. to yield an NMP solution (solid content concentration: 8%) of a polymer A as a binder.

The iodine value of the obtained polymer A was measured. Note that the iodine value of the polymer was measured in accordance with JIS K6235(2006) after causing coagulation of the polymer. It was confirmed through calculation from the obtained iodine value that the polymer A included a 1,3-butadiene monomer unit as a diene monomer unit in a proportion of 1.5% and a hydrogenated 1,3-butadiene unit as an alkylene structural unit in a proportion of 38.5%.

The polymer A had a glass-transition temperature of 7.8° C.

<Polymer B>

An NMP solution (solid content concentration: 8%) of a polymer B as a binder was obtained in the same way as the polymer A with the exception that the amount of acrylonitrile as a nitrile group-containing monomer was changed to 50.0 parts and the amount of 1,3-butadiene as a diene monomer was changed to 50.0 parts.

The iodine value of the obtained polymer B was measured in the same way as for the polymer A. It was confirmed through calculation from the obtained iodine value that the polymer B included a 1,3-butadiene monomer unit as a diene monomer unit in a proportion of 1.8% and a hydrogenated 1,3-butadiene unit as an alkylene structural unit in a proportion of 48.2%.

The Polymer B had a Glass-Transition Temperature of −12° C.

<Polymer C>

An NMP solution (solid content concentration: 8%) of a polymer C as a binder was obtained in the same way as the polymer A with the exception that the amount of acrylonitrile as a nitrile group-containing monomer was changed to 40.0 parts and the amount of 1,3-butadiene as a diene monomer was changed to 60.0 parts.

The iodine value of the obtained polymer C was measured in the same way as for the polymer A. It was confirmed through calculation from the obtained iodine value that the polymer C included a 1,3-butadiene monomer unit as a diene monomer unit in a proportion of 1.3% and a hydrogenated 1,3-butadiene unit as an alkylene structural unit in a proportion of 58.7%.

The polymer C had a glass-transition temperature of −29° C.

<Polymer D>

A reactor A having a mechanical stirrer and a condenser attached thereto was charged with 85 parts of deionized water and 0.2 parts of sodium linear alkylbenzenesulfonate in a nitrogen atmosphere. The contents of the reactor A were heated to 55° C. under stirring and 0.3 parts of potassium persulfate was added into the reactor A in the form of a 5.0% aqueous solution. Next, 62.0 parts of acrylonitrile as a nitrile group-containing monomer, 2.0 parts of methacrylic acid as an acidic group-containing monomer, 35.0 parts of 2-hydroxyethyl acrylate as a (meth)acrylic acid ester monomer, 1.0 parts of acrylamide as a (meth)acrylamide monomer, 0.6 parts of sodium linear alkylbenzenesulfonate, 0.035 parts of t-dodecyl mercaptan, 0.4 parts of polyoxyethylene lauryl ether, and 80 parts of deionized water were added into a vessel B with an attached mechanical stirrer in a nitrogen atmosphere, and were stirred and emulsified to produce a monomer mixture. This monomer mixture was added into the reactor A at a constant rate over 5 hours while in a stirred and emulsified state, and a reaction was carried out until the polymerization conversion rate reached 95% to yield a water dispersion of a copolymer. NMP was added to the obtained water dispersion of the copolymer so as to adjust the solid content concentration of the copolymer to 7%. Water and excess NMP were then removed by vacuum distillation at 90° C. to yield an NMP solution (solid content concentration: 8%) of a polymer D as a binder.

The polymer D had a glass-transition temperature of 66° C.

<Polymer E>

A 5 MPa pressure vessel equipped with a stirrer was charged with 64 parts of styrene as an aromatic vinyl monomer, 32 parts of 1,3-butadiene as a diene monomer, 3 parts of itaconic acid as an acidic group-containing monomer, 1 part of 2-hydroxyethyl acrylate as a (meth)acrylic acid ester monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. The reaction was terminated by cooling at the point at which the polymerization conversion rate reached 95.0%. The resultant water dispersion of a copolymer was adjusted to pH 8 through addition of 5% sodium hydroxide aqueous solution. Unreacted monomer was subsequently removed by thermal-vacuum distillation. Thereafter, cooling was performed to a temperature of 30° C. or lower to obtain a water dispersion of a polymer E as a binder.

The polymer E had a glass-transition temperature of 17° C.

<Polymer F>

A water dispersion of a polymer F as a binder was obtained in the same way as the polymer E with the exception that the amount of styrene as an aromatic vinyl monomer was changed to 32 parts, the amount of 1,3-butadiene as a diene monomer was changed to 37 parts, and 30 parts of methacrylic acid was used instead of itaconic acid as an acidic group-containing monomer.

The polymer F had a glass-transition temperature of 37° C.

<Polymer G>

A water dispersion of a polymer G as a binder was obtained in the same way as the polymer E with the exception that the amount of styrene as an aromatic vinyl monomer was changed to 32 parts, the amount of 1,3-butadiene as a diene monomer was changed to 54 parts, and 10 parts of acrylonitrile was additionally used as a nitrile group-containing monomer.

The polymer G had a glass-transition temperature of −23° C.

Example 1

<Production of Positive Electrode>

A slurry composition for a positive electrode mixed material layer was produced by adding 100 parts of a lithium-containing complex oxide of Co-Ni-Al ($LiNi_{0.8}Co_{0.15}Al_{0.05}O_2$) as a positive electrode active material, 2 parts of acetylene black (produced by Denki Kagaku Kogyo Kabushiki Kaisha; product name: HS-100) as a conductive material, 2 parts in terms of solid content of the NMP solution of the polymer A as a binder, and 0.8 parts of azodicarbonamide (foaming temperature: 200° C.; average particle diameter: 5 μm; nitrogen content: 48 weight %) as a foaming agent into a planetary mixer, further adding NMP as a dispersion medium to adjust the total solid content concentration to 67%, and then mixing these materials.

A comma coater was then used to apply the obtained slurry composition for a positive electrode mixed material layer onto aluminum foil (thickness: 20 μm) serving as a current collector so as to have a coating weight of 20±0.5 $mg/cm^2$.

The slurry composition on the aluminum foil was dried by conveying the aluminum foil inside a 90° C. oven for 4 minutes and inside a 100° C. oven for 4 minutes at a speed of 300 mm/min, and in this manner a positive electrode web including a positive electrode mixed material layer formed on the current collector was obtained.

The positive electrode mixed material layer-side of the produced positive electrode web was subsequently roll pressed in an environment having a temperature of 25 ±3° C. and with a line pressure of 14 t (tons) to obtain a positive electrode having a positive electrode mixed material layer density of 3.40 $g/cm^3$. Thereafter, the positive electrode was left for 1 week in an environment having a temperature of 25±3° C. and a relative humidity of 50±5%. The positive electrode that had been left was subsequently used to evaluate the content of foaming agent (organonitrogen foaming agent) in the positive electrode mixed material layer, the peel strength of the positive electrode, and the volume resistivity of the positive electrode laminate (electrode laminate). The results are shown in Table 1.

<Production of Negative Electrode>

A planetary mixer was charged with 50 parts of artificial graphite (theoretical capacity: 360 mAh/g) and 50 parts of natural graphite (theoretical capacity: 360 mAh/g) as negative electrode active materials, and 1 part in terms of solid content of carboxymethyl cellulose as a thickener. These materials were diluted to a solid content concentration of 60% with deionized water and were then kneaded at a rotation speed of 45 rpm for 60 minutes. Next, 1 part in terms of solid content of the water dispersion of the polymer E was added as a binder, and a further 40 minutes of kneading was performed at a rotation speed of 40 rpm. Deionized water was added to adjust the viscosity to 3,000±500 mPa·s (measured by a B-type viscometer at 25° C. and 60 rpm) and thereby produce a slurry composition for a negative electrode mixed material layer.

A comma coater was then used to apply the obtained slurry composition for a negative electrode mixed material layer onto the surface of copper foil (thickness: 15 μm) serving as a current collector so as to have a coating weight of 11±0.5 $mg/cm^2$. The copper foil with the slurry composition for a negative electrode mixed material layer applied thereon was subsequently conveyed inside an 80° C. oven for 2 minutes and inside a 100° C. oven for 2 minutes at a speed of 500 mm/min so as to dry the slurry composition on the copper foil and thereby obtain a negative electrode web including a negative electrode mixed material layer formed on the current collector.

The negative electrode mixed material layer-side of the produced negative electrode web was subsequently roll pressed in an environment having a temperature of 25±3° C. and with a line pressure of 11 t (tons) to obtain a negative electrode having a negative electrode mixed material layer density of 1.60 $g/cm^3$. Thereafter, the negative electrode was left for 1 week in an environment having a temperature of 25±3° C. and a relative humidity of 50±5%.

<Preparation of Separator>

A separator made from polypropylene (product name: Celgard® 2500 (Celgard is a registered trademark in Japan, other countries, or both)) was prepared as a separator.

<Production of Lithium Ion Secondary Battery>

The positive electrode that had been left as described above was cut out as 49 cm×4.5 cm and was placed on a horizontal stage such that the surface at the positive electrode mixed material layer-side was on top. The separator described above was cut out as 120 cm×5.0 cm and was arranged on the positive electrode such that the positive electrode was positioned at a longitudinal direction left-hand side of the separator. The negative electrode that had been left as described above was cut out as 50 cm×4.7 cm and was arranged on the separator such that the surface at the negative electrode mixed material layer-side faced toward the separator and such that the negative electrode was positioned at a longitudinal direction right-hand side of the separator. A winding machine was used to wind the resultant product with the middle of the separator in the longitudinal direction at the center to obtain a roll. The roll was pressed into a flattened form at 60° C. and 0.5 MPa and was then enclosed in an aluminum packing case serving as a battery case. The aluminum packing case was then filled with a $LiPF_6$ solution of 1.0 M in concentration (solvent: mixed solvent of ethylene carbonate/diethyl carbonate=3/7 (volume ratio); additive: containing 2 volume% (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. The lithium ion secondary battery was used to evaluate rate characteristics, high-temperature storage characteristics, and safety. The results are shown in Table 1.

Examples 2 to 4

A positive electrode, a negative electrode, and a separator were prepared and a lithium ion secondary battery was produced in the same way as in Example 1 with the exception that the polymer B, the polymer C, or the polymer D was used instead of the polymer A as a binder in production of the positive electrode. The evaluations were also performed in the same way as in Example 1. The results are shown in Table 1.

Examples 5 and 6

A positive electrode, a negative electrode, and a separator were prepared and a lithium ion secondary battery was produced in the same way as in Example 1 with the exception that melamine cyanurate (foaming temperature: 300° C.; average particle diameter: 2 µm; nitrogen content: 49 weight %) or trihydrazine triazine (foaming temperature: 270° C.; average particle diameter: 5 µm; nitrogen content: 74 weight %) was used instead of azodicarbonamide as a foaming agent in production of the positive electrode. The evaluations were also performed in the same way as in Example 1. The results are shown in Table 1.

Example 7

A positive electrode, a negative electrode, and a separator were prepared and a lithium ion secondary battery was produced in the same way as in Example 1 with the exception that a foaming agent was not used in production of the positive electrode and a slurry composition for a negative electrode mixed material layer obtained by adding 0.5 parts of azodicarbonamide (foaming temperature: 200° C.) as a foaming agent at the same time as the polymer E as a binder was used in production of the negative electrode. The evaluations were also performed in the same way as in Example 1 with the exception that the content of organonitrogen foaming agent in the negative electrode mixed material layer was evaluated instead of that in the positive electrode mixed material layer, and peel strength and volume resistivity of the negative electrode were evaluated instead of those of the positive electrode. The results are shown in Table 1.

Examples 8 and 9

A positive electrode, a negative electrode, and a separator were prepared and a lithium ion secondary battery was produced in the same way as in Example 7 with the exception that the polymer F or the polymer G was used instead of the polymer E as a binder in production of the negative electrode. The evaluations were also performed in the same way as in Example 7. The results are shown in Table 1.

Examples 10 and 11

A positive electrode, a negative electrode, and a separator were prepared and a lithium ion secondary battery was produced in the same way as in Example 7 with the exception that the amount of azodicarbonamide used as a foaming agent in production of the negative electrode was changed to 2 parts or 5 parts. The evaluations were also performed in the same way as in Example 7. The results are shown in Table 1.

Example 12

A positive electrode, a negative electrode, and a separator were prepared and a lithium ion secondary battery was produced in the same way as in Example 7 with the exception that sodium hydrogen carbonate (foaming temperature: 150° C.; average particle diameter: 10 µm; released amount of carbon dioxide gas: 130 mL/g) was used instead of azodicarbonamide as a foaming agent in production of the negative electrode. The content of inorganic foaming agent in the negative electrode mixed material layer was evaluated and other evaluations were performed in the same way as in Example 7. The results are shown in Table 1.

Comparative Example 1

A positive electrode, a negative electrode, and a separator were prepared and a lithium ion secondary battery was produced in the same way as in Example 1 with the exception that a foaming agent was not used in production of the positive electrode. The evaluations were also performed in the same way as in Example 1. The results are shown in Table 1.

Comparative Example 2

A positive electrode, a negative electrode, and a separator were prepared and a lithium ion secondary battery was produced in the same way as in Example 1 with the exception that polyvinylidene fluoride (glass-transition temperature: −40° C.) was used instead of the polymer A as a binder in production of the positive electrode. The evaluations were also performed in the same way as in Example 1. The results are shown in Table 1.

In Table 1, shown below:
"NCA" indicates lithium-containing complex oxide of Ni-Co-Al;
"PVDF" indicates polyvinylidene fluoride;
"ST" indicates styrene unit;
"BD" indicates 1,3-butadiene unit;

"Hydrogenated BD" indicates hydrogenated 1,3-butadiene unit;
"AN" indicates acrylonitrile unit;
"MAA" indicates methacrylic acid unit;
"IA" indicates itaconic acid unit;
"2-HEA" indicates 2-hydroxyethyl acrylate unit;
"AAm" indicates acrylamide unit;
"ADCA" indicates azodicarbonamide;
"MC" indicates melamine cyanurate;
"THT" indicates trihydrazine triazine; and
"NaHCO$_3$" indicates sodium hydrogen carbonate.

TABLE 1

| | | | | Example 1 | Example 2 | Example 3 | Example 4 | Example 5 | Example 6 |
|---|---|---|---|---|---|---|---|---|---|
| Electrode for electrochemical device | Type (evaluated electrode) | | | Positive electrode NCA | Positive electrode NCA | Positive electrode NCA | Positive electrode NCA | Positive electrode NCA | Positive electrode NCA |
| | Electrode mixed material layer | Electrode active material | Type | | | | | | |
| | | Binder | Type | Polymer A | Polymer B | Polymer C | Polymer D | Polymer A | Polymer A |
| | | | Repeating units ST [mass %] | — | — | — | — | — | — |
| | | | BD [mass %] | 1.5 | 1.8 | 1.3 | — | 1.5 | 1.5 |
| | | | Hydrogenated BD [mass %] | 38.5 | 48.2 | 58.7 | — | 38.5 | 38.5 |
| | | | AN [mass %] | 60 | 50 | 40 | 62 | 60 | 60 |
| | | | MAA [mass %] | — | — | — | 2 | — | — |
| | | | IA [mass %] | — | — | — | — | — | — |
| | | | 2-HEA [mass %] | — | — | — | 35 | — | — |
| | | | AAm [mass %] | — | — | — | 1 | — | — |
| | | | Diene monomer unit + nitrile group-containing monomer unit [mass %] | 61.5 | 51.8 | 41.3 | 62 | 61.5 | 61.5 |
| | | | Glass-transition temperature [° C.] | 7.8 | −12 | −29 | 66 | 7.8 | 7.8 |
| | | | Content per 100 parts of electrode active material [parts by mass] | 2 | 2 | 2 | 2 | 2 | 2 |
| | | Foaming agent | Type | ADCA | ADCA | ADCA | ADCA | MC | THT |
| | | | Foaming temperature [° C.] | 200 | 200 | 200 | 200 | 300 | 270 |
| | | | Content per 100 parts of electrode active material [parts by mass] | 0.8 | 0.8 | 0.8 | 0.8 | 0.8 | 0.8 |
| | Volume resistivity $R_A$ (25° C.) [Ω · cm] | | | 80 | 90 | 85 | 100 | 120 | 160 |
| | Volume resistivity $R_B$ (350° C.)/Volume resistivity $R_A$ (25° C.) [—] | | | 300 | 330 | 380 | 30 | 120 | 50 |
| Evaluation | Peel strength | | | A | B | C | C | A | A |
| | Rate characteristics | | | A | A | A | A | B | C |
| | High-temperature storage characteristics | | | A | B | C | A | A | A |
| | Safety | | | A | A | A | C | B | C |

| | | | | Example 7 | Example 8 | Example 9 | Example 10 | Example 11 |
|---|---|---|---|---|---|---|---|---|
| Electrode for electrochemical device | Type (evaluated electrode) | | | Negative electrode Graphite | Negative electrode Graphite | Negative electrode Graphite | Negative electrode Graphite | Negative electrode Graphite |
| | Electrode mixed material layer | Electrode active material | Type | | | | | |
| | | Binder | Type | Polymer E | Polymer F | Polymer G | Polymer E | Polymer E |
| | | | Repeating units ST [mass %] | 64 | 32 | 32 | 64 | 64 |
| | | | BD [mass %] | 32 | 37 | 54 | 32 | 32 |
| | | | Hydrogenated BD [mass %] | — | — | — | — | — |
| | | | AN [mass %] | — | — | 10 | — | — |
| | | | MAA [mass %] | — | 30 | — | — | — |
| | | | IA [mass %] | 3 | — | 3 | 3 | 3 |
| | | | 2-HEA [mass %] | 1 | 1 | 1 | 1 | 1 |
| | | | AAm [mass %] | — | — | — | — | — |
| | | | Diene monomer unit + nitrile group-containing monomer unit [mass %] | 32 | 37 | 64 | 32 | 32 |
| | | | Glass-transition temperature [° C.] | 17 | 37 | −23 | 17 | 17 |
| | | | Content per 100 parts of electrode active material [parts by mass] | 1 | 1 | 1 | 1 | 1 |
| | | Foaming agent | Type | ADCA | ADCA | ADCA | ADCA | ADCA |
| | | | Foaming temperature [° C.] | 200 | 200 | 200 | 200 | 200 |
| | | | Content per 100 parts of electrode active material [parts by mass] | 0.5 | 0.5 | 0.5 | 2 | 5 |
| | Volume resistivity $R_A$ (25° C.) [Ω · cm] | | | 1 | 1.2 | 0.8 | 3.5 | 5 |
| | Volume resistivity $R_B$ (350° C.)/Volume resistivity $R_A$ (25° C.) [—] | | | 270 | 180 | 350 | 300 | 400 |

TABLE 1-continued

| | | | | | | | | | |
|---|---|---|---|---|---|---|---|---|---|
| Evaluation | Peel strength | | | | | A | B | B | B | C |
| | Rate characteristics | | | | | A | A | A | B | C |
| | High-temperature storage characteristics | | | | | A | A | B | A | A |
| | Safety | | | | | A | B | A | A | A |

| | | | | | | Example 12 | Comparative Example 1 | Comparative Example 2 |
|---|---|---|---|---|---|---|---|---|
| | Electrode for electrochemical device | Type (evaluated electrode) | | | | Negative electrode | Positive electrode | Positive electrode |
| | | Electrode mixed material layer | Electrode active material | Type | | Graphite | NCA | NCA |
| | | | Binder | Type | | Polymer E | Polymer A | PVDF |
| | | | | Repeating units | ST [mass %] | 64 | — | |
| | | | | | BD [mass %] | 32 | 1.5 | |
| | | | | | Hydrogenated BD [mass %] | — | 38.5 | |
| | | | | | AN [mass %] | — | 60 | |
| | | | | | MAA [mass %] | — | — | |
| | | | | | IA [mass %] | 3 | — | |
| | | | | | 2-HEA [mass %] | 1 | — | |
| | | | | | AAm [mass %] | — | — | |
| | | | | Diene monomer unit + nitrile group-containing monomer unit [mass %] | | 32 | 61.5 | 0 |
| | | | | Glass-transition temperature [° C.] | | 17 | 7.8 | −40 |
| | | | | Content per 100 parts of electrode active material [parts by mass] | | 1 | 2 | 2 |
| | | | Foaming agent | Type | | NaHCO$_3$ | — | ADCA |
| | | | | Foaming temperature [° C.] | | 150 | — | 200 |
| | | | | Content per 100 parts of electrode active material [parts by mass] | | 0.5 | — | 0.8 |
| | | Volume resistivity $R_A$ (25° C.) [Ω·cm] | | | | 0.9 | 110 | 175 |
| | | Volume resistivity $R_B$ (350° C.)/Volume resistivity $R_A$ (25° C.) [—] | | | | 13 | 8 | 15 |
| Evaluation | Peel strength | | | | | A | D | E |
| | Rate characteristics | | | | | C | B | C |
| | High-temperature storage characteristics | | | | | B | B | D |
| | Safety | | | | | C | E | E |

It can be seen from Table 1 that the electrodes of Examples 1 to 12, which each include an electrode mixed material layer containing an electrode active material, a specific binder, and a foaming agent on a current collector, and for each of which the volume resistivity $R_A$ (25° C.) of an electrode laminate is within a range of 0.1 Ω·cm to 200 Ω·cm and the value of volume resistivity $R_B$ (350° C.)/volume resistivity $R_A$ (25° C.) is 10 or more, have excellent peel strength and can provide a lithium ion secondary battery with a high level of safety. It can also be seen that the electrodes of Examples 1 to 12 can cause a lithium ion secondary battery to display excellent rate characteristics and high-temperature storage characteristics.

On the other hand, it can be seen that the positive electrode of Comparative Example 1, which does not contain a foaming agent in the positive electrode mixed material layer and has a value of less than 10 for volume resistivity $R_B$ (350° C.)/volume resistivity $R_A$ (25° C.) of an electrode laminate, has poor peel strength and cannot provide a lithium ion secondary battery with a high level of safety.

Moreover, it can be seen that the positive electrode of Comparative Example 2, which includes a positive electrode mixed material layer formed using polyvinylidene fluoride instead of the specific binder, has poor peel strength, cannot provide a lithium ion secondary battery with a high level of safety, and cannot cause a lithium ion secondary battery to display good enough high-temperature storage characteristics.

INDUSTRIAL APPLICABILITY

According to the present disclosure, it is possible to provide an electrode for an electrochemical device that has excellent peel strength and can ensure a high level of safety of an electrochemical device, and also to provide a method of producing this electrode for an electrochemical device.

Moreover, according to the present disclosure, it is possible to provide an electrochemical device in which a high level of safety is ensured.

The invention claimed is:

1. A positive electrode for an electrochemical device comprising a current collector and a positive electrode mixed material layer on the current collector, wherein
the positive electrode mixed material layer contains a positive electrode active material, a binder, and a foaming agent,
the binder is a polymer including a nitrile group-containing monomer unit, and in which a proportion constituted by a diene monomer unit and a proportion constituted by the nitrile group-containing monomer unit are, in total, not less than 55 mass % and not more than 80 mass %, and in which a proportion constituted by the nitrile group-containing monomer unit is 55 mass % or more, when the amount of all repeating units included in the polymer is taken to be 100 mass %, and
volume resistivity $R_A$ of a laminate of the positive electrode mixed material layer and the current collector at 25° C. is not less than 0.1 Ω·cm and not more than 200 Ω·cm, and a ratio of volume resistivity $R_B$ of the laminate at 350° C. relative to the volume resistivity $R_A$ of the laminate at 25° C. is 10 or more.

2. The positive electrode for an electrochemical device according to claim 1, wherein the foaming agent has a foaming temperature of not lower than 100° C. and not higher than 350° C.

3. The positive electrode for an electrochemical device according to claim 1, wherein the positive electrode mixed material layer contains not less than 0.01 parts by mass and not more than 10 parts by mass of the foaming agent per 100 parts by mass of the positive electrode active material.

4. The positive electrode for an electrochemical device according to claim 1, wherein the foaming agent is an organonitrogen foaming agent.

5. The positive electrode for an electrochemical device according to claim 1, wherein the polymer has a glass-transition temperature of not lower than −30° C. and not higher than 100° C.

6. The positive electrode for an electrochemical device according to claim 1, wherein the volume resistivity $R_A$ of the laminate at 25° C. is not less than 10 Ω·cm and not more than 180 Ω·cm.

7. An electrochemical device comprising the positive electrode for an electrochemical device according to claim 1.

8. A method of producing the positive electrode for an electrochemical device according to claim 1, comprising:

applying a slurry composition for a positive electrode mixed material layer containing the positive electrode active material, the binder, the foaming agent, and a solvent onto the current collector; and drying the slurry composition for a positive electrode mixed material layer applied on the current collector at a temperature of not lower than 50° C. and not higher than 130° C. to form a positive electrode mixed material layer.

* * * * *